April 30, 1940.  F. O. BROOKS  2,199,167
TRAP
Filed June 15, 1939  4 Sheets-Sheet 1

Inventor
F. O. Brooks,
By Rose J. Woodward.
Attorney

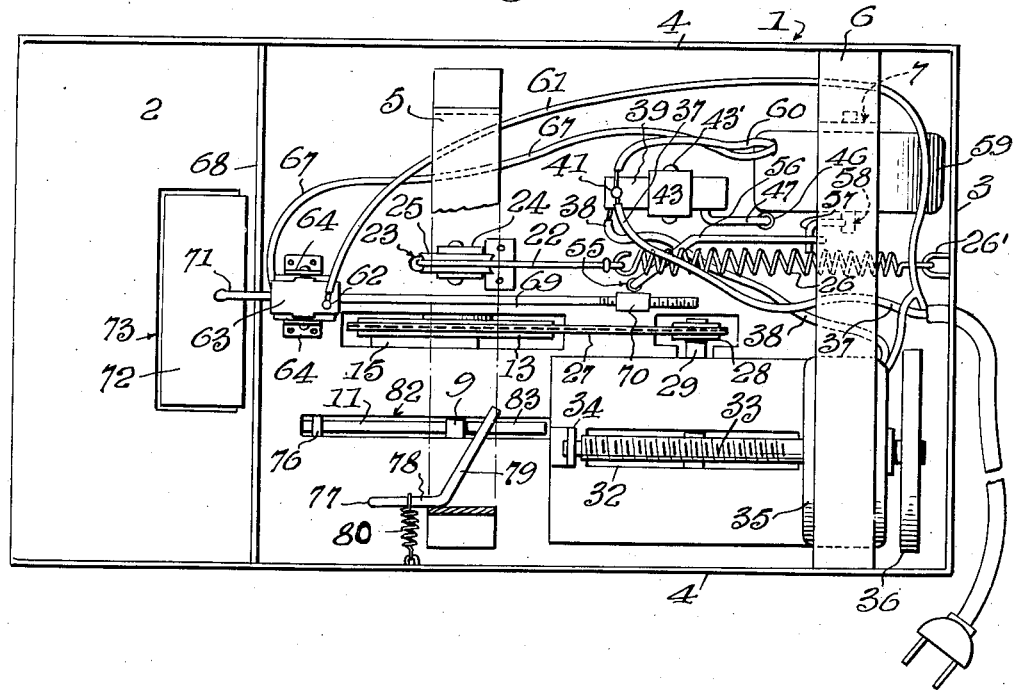

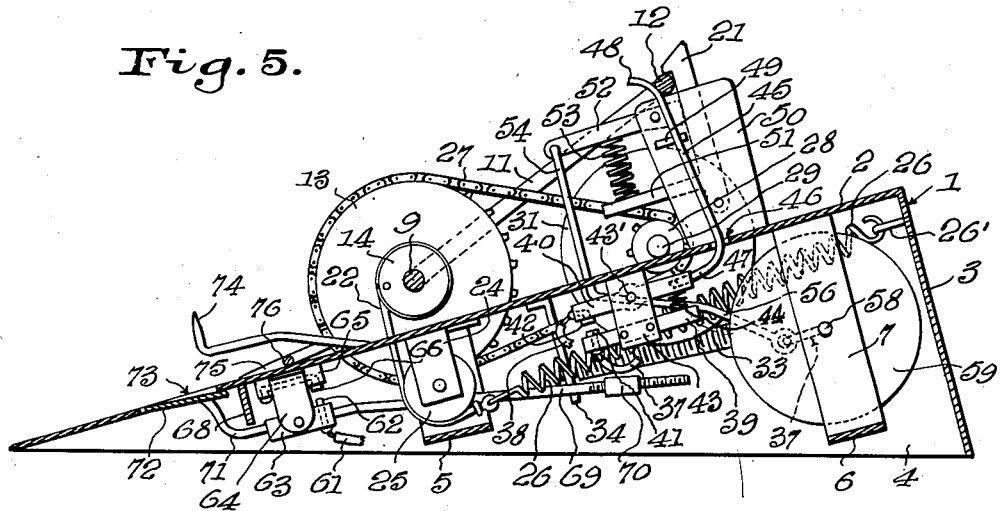

April 30, 1940.  F. O. BROOKS  2,199,167
TRAP
Filed June 15, 1939  4 Sheets-Sheet 4
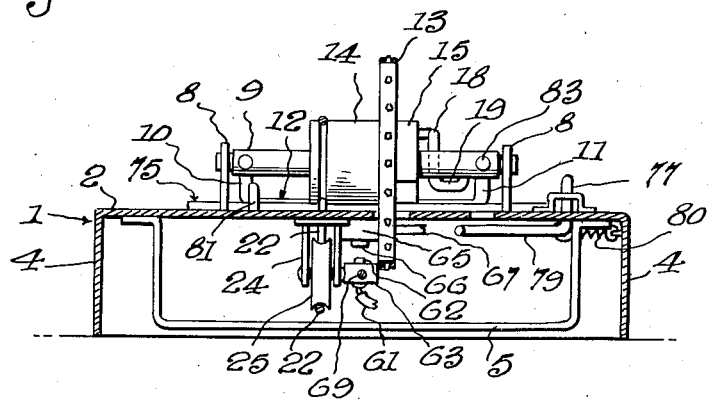
Inventor
F. O. Brooks,
By Ross J. Woodward.
Attorney Patented Apr. 30, 1940

2,199,167

UNITED STATES PATENT OFFICE 2,199,167

TRAP

Frazier O. Brooks, Roxboro, N. C., assignor of fifty percent to Leland G. Clayton, Roxboro, N. C.

Application June 15, 1939, Serial No. 279,353

12 Claims. (Cl. 43—75)

This invention relates to traps and more particularly to a trap of the spring jaw type which is primarily intended for catching rats and mice but may be used for catching other animals.

One object of the invention is to provide a trap of the spring jaw type having electrically operated means for resetting the jaw after killing an animal, the jaw when reset serving to open a switch and shut off the motor which resets the jaw. It will thus be seen that manual resetting of the jaw is unnecessary and that a number of animals may be caught one after another.

Another object of the invention is to so construct the trap that when a treadle is depressed by an animal stepping thereon, a circuit will be closed and electrically operated means energized to move a latch or keeper to a position releasing the jaw, a second circuit being then closed to energize electrically operated means for restoring the jaw to a set position in which it operates a switch to open the circuit through the setting means. It will thus be seen that release of the jaw and resetting thereof is accomplished by electrically operated means and quick release of the jaw and sure return thereof to a set position obtained.

Another object of the invention is to provide means for moving a killed animal away from the jaw releasing treadle and out of position under the jaw. Therefore, proper resetting of the trap will be obtained and a killed animal will not be in the way.

Another object of the invention is to provide a trap having electrically energized members capable of withstanding current of standard house voltage, thus making it possible to plug the trap into a convenient outlet socket of a lighting system and having it unnecessary to provide a transformer in order to step the circuit down to a predetermined voltage in order to use the trap.

Another object of the invention is to provide a trap of simple construction which is durable and not liable to get out of order.

The invention is illustrated in the accompanying drawings, wherein:

Fig. 3 is a bottom plan view of the trap.

Fig. 4 is a side elevation of the trap.

Fig. 5 is a vertical sectional view taken longitudinally through the trap.

Fig. 6 is a fragmentary view on an enlarged scale of the disk and latch means for swinging the striker to raised position.

Fig. 7 is another view of the striker setting means shown in Fig. 6.

Fig. 8 is a sectional view taken on the line 8—8 of Fig. 7.

Fig. 9 is a transverse section taken along the line 9—9 of Figure 2.

Fig. 10 is a sectional view taken along the line 10—10 of Figure 2.

Fig. 11 shows a magnet which may actuate the jaw holding latch.

Figure 1:
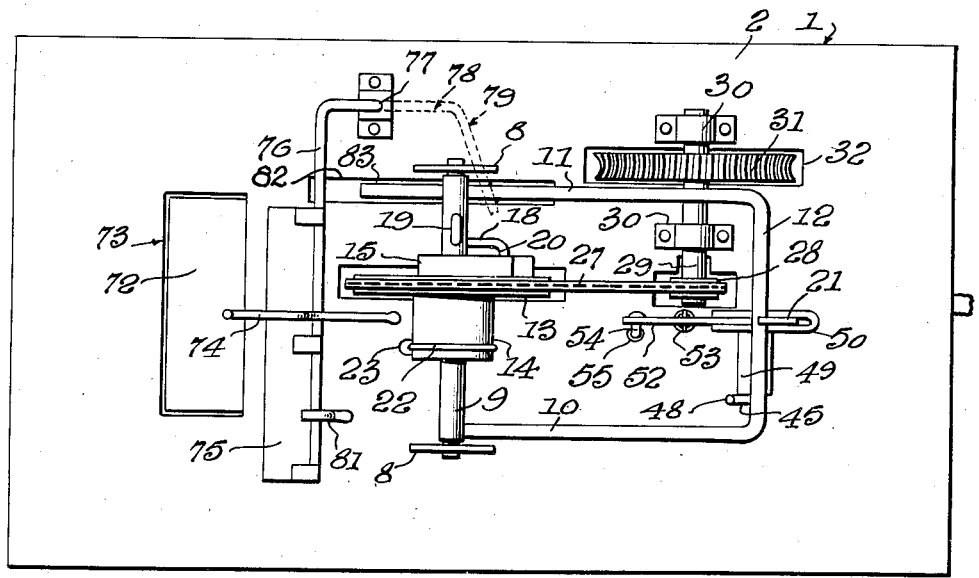
Fig. 1 is a top plan view showing the trap set.

This improved trap embodies a base 1 which is preferably formed of strong sheet metal and has a top wall 2, a rear wall 3 and side walls 4, the side walls being of triangular outline, as shown in Fig. 4, so that the top wall extends at an upward incline from its front end to its rear end. By so forming the base, a space or chamber will be provided under the top wall to accommodate a portion of the mechanism, as shown in Fig. 5, and in addition, a mouse, rat or other animal to be caught, can very easily step upon the base from the front end thereof. Yokes 5 and 6 extend transversely of the base in the space under the top wall and constitute means for reinforcing the base as well as means for shielding and supporting certain of the operating mechanism. The rear yoke 6 is reinforced by a brace 7 extending vertically intermediate the width of the trap with its ends firmly secured to the yoke and the top wall 2 of the base.

Figure 2:
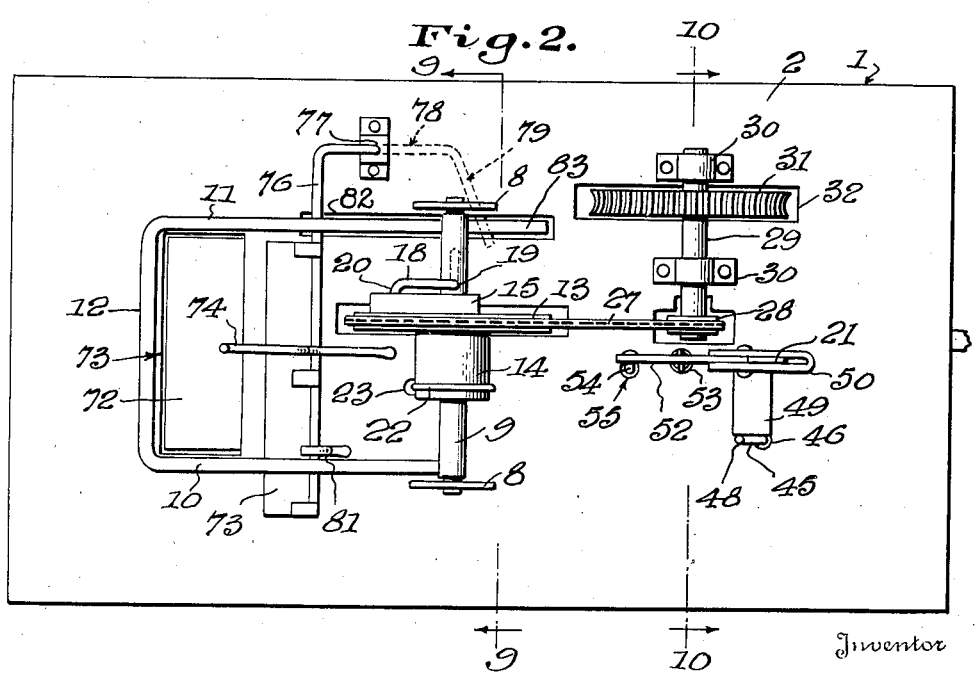
Fig. 2 is a top plan view showing the trap sprung and the striker in lowered position.

Bearing brackets 8 for rotatably supporting a shaft 9 extend upwardly from the base in spaced relation to side edges of the top wall 2, and through this shaft are mounted the arms 10 and 11 of a U-shaped striker 12 formed of strong metal rod. A large sprocket wheel 13 is carried by the shaft 9 to turn freely thereon at times, and, at one side of this wheel, is a drum 14 while at its other side is a thick plate 15 formed with an opening 16 to register with a socket 17 formed in the sprocket wheel. The drum and plate are fixed to the shaft and, in order to cause the sprocket wheel to turn with the shaft during setting of the striker, there has been provided a latch 18 formed of resilient metal and having one end bent to form an arm 19 secured through the shaft and its other end bent to form a bill 20 slidably engaged through the opening 16 and projecting therefrom for engaging in the socket 17 of the sprocket wheel, as shown in Figs. 7 and 8. When the sprocket wheel is turned, the end of the bill will move along the confronting side face of the sprocket until it engages in the socket. The shaft will then turn with the sprocket to swing the striker from the lowered position shown in Fig. 2, to the raised or set position shown in Fig. 1, where it will be engaged by the latch or keeper 21 and continued rotation of the sprocket wheel will cause the bill of the latch 18 to move out of the socket. It will thus be seen that rotation of the sprocket wheel may continue after the striker has moved to its set position.

When the latch or keeper is moved to releasing position, the striker is violently swung forwardly and downwardly toward the base so that it will strike an animal a very hard blow and kill the animal. This striking motion is accomplished through the medium of a strong cord or light wire 22 wound about the drum 14 and extending downwardly therefrom through an opening 23 formed in the top wall of the base. A bracket 24 carrying a pulley 25 is secured against the under face of the wall 2 and the pull cord is engaged with this pulley, as shown in Fig. 5, and then extended rearwardly and secured to the front end of a strong coiled spring 26 which extends longitudinally of the base with its rear end anchored to the eye 26' carried by the rear wall. During movement of the striker the pull cord will be wound upon the drum and the spring stretched, and when the keeper is moved to a releasing position the spring will rapidly contract and exert pull upon the cord to turn the drum and thus rotate the shaft to swing the striker forwardly and downwardly to deliver a hard blow and kill the animal that has sprung the trap.

In order to transmit rotary motion to the sprocket wheel 13, in a direction to swing the striker upwardly to a set position, there has been provided a sprocket chain 27 trained about the sprocket 13 and also trained about a small sprocket wheel 28 carried by a shaft 29 rotatably mounted in bearings 30. This drive shaft 29 carries a large worm gear 31 operating in a slot 32 formed in the top wall of the base and the lower portion of the worm gear meshes with a worm shaft 33 extending longitudinally of the base and having its front end rotatably mounted in a bearing bracket 34 and its rear end connected with the shaft of an electric motor 35 which is supported between the rear yoke 6 and the top wall of the base. A fly wheel 36 is also carried by the shaft of the motor, so that sufficient momentum will be imparted to continue rotation of the sprocket wheel 13 for a short time after the motor has been shut off and move the bill of the latch 18 out of the socket 17 of the sprocket wheel.

The circuit for the motor 35 includes wires 37 and 38 leading to a stationary block 39 of insulation and a movable block 40 also of insulation, where they are attached to contacts 41 and 42. The blocks of insulation are carried by a bracket 43 depending from the top wall 2, the block 39 being rigidly mounted and the block 40 pivotally mounted midway of its length, and, in order to urge the contacts 41 and 42 toward each other, there has been provided a spring 44 operating between rear ends of the two blocks to tilt the upper block 40 about the pin 43' and swing the forward end of this block downwardly until the contact 42 engages the contact 41. A trigger 45 formed from a strand of stiff wire extends vertically through an opening 46 formed in the top wall of the base and has its lower portion bent to form an arm 47 pivoted at its front end to the rear end of the block 40. The upper end of the trigger is curved forwardly, as shown at 48, to provide a guide for engagement by the bridge of the striker when the striker is moved into position for engagement by the keeper 21. As the striker moves into engagement with the keeper, it slides along the trigger and rocks the trigger forwardly so that the arm 47 is swung downwardly and the block 40 rocked about the pin 43' to raise the forward end of the block and move the contact 42 out of engagement with the contact 41. This will break the circuit through the motor 35, but momentum created by the flywheel will cause the motor and the worm shaft to continue rotation for a short time and the finger 20 of the latch 18 will be dislodged from the socket 17 of the sprocket wheel 13. Therefore, when the striker is released and swung forwardly and downwardly to strike and kill a rat or other animal and the circuit is again closed to start the motor, the striker will remain in its forward position in holding engagement with the animal until the sprocket wheel has turned to a position in which the latch may again engage in its socket and the striker will be swung upwardly and rearwardly to set position. As the animal will be held by the striker or jaw for a short time after being struck, quick killing of the animal will be assured. A strip 49 extending laterally from one side of the standard 50 carrying the keeper 21 serves as a guide for the trigger 45 and directs it in a straight path during its movement.

The standard 50 for mounting the keeper is formed from a folded strip of metal to provide spaced leaves or walls between which the keeper is pivoted in a vertical position and in spaced relation to its pivoted lower end the keeper carries an arm 51 which projects forwardly from the standard. A lever 52, which extends horizontally, is pivotally mounted between upper portions of the leaves of the standard and has an enlarged rear end portion for engaging the front edge of the keeper. A spring 53 disposed vertically between the arm 51 and the lever 52, exerts pressure to yieldably hold the lever and the keeper in normal position shown in Fig. 4, but permits the keeper to move into latching engagement with the striker, as shown in Fig. 5, and also permits the lever to be swung downwardly so that its rear end will exert cam action on the keeper and swing the keeper rearwardly into position to release the striker. A pull rod 54 extends vertically through an opening 55 in the top of the base and below the top is bent to form an arm 56 which extends rearwardly and, at its rear end, is engaged with a crank arm 57 carried by the shaft 58 of a second motor 59. This motor constitutes electrically energized means for exerting pull on the arm 56 to draw the rod 54 downwardly and when the rod is drawn downwardly, the lever 52 will be swung downwardly to move the keeper to a releasing position. A solenoid or electro-magnet 59' may be employed in lieu of the motor 59.

The lead wire 60 of this motor extends to the contact 41 and the power wire 61 extends to a contact 62 carried by a block of insulation 63. This block of insulation is pivotally carried by brackets 64 depending from the top of the base and is located under a block of insulation 65 carrying a stationary contact 66 with which the contact 62 engages when the pivoted block is rocked in a direction to move its rear end upwardly. The other lead wire 67 of the motor 59 is secured to the contact 66 and when the circuit is closed the motor will be energized and the arm 57 swung to draw the pull rod downwardly and move the keeper to releasing position. The switch, of which the blocks of insulation 63 and 65 constitute elements, is located back of a reinforcing strip 68, and in order to normally maintain the switch open, there has been provided a balancing rod or arm 69 extending rearwardly from the pivoted block 63 and carrying a counterweight 70. A short arm 71 extends forwardly from the block 63 across the strip 68 and is bent upwardly, as shown in Fig. 5, with its front end secured to the under face of a treadle 72 disposed under an opening 73 formed in the top wall of the base. This opening is located midway the width of the base in spaced relation to the front end thereof and, in order to attract an animal and cause it to step upon the treadle, there has been provided a bait holder 74 carried by the top wall and overhanging the rear portion of the opening 73 midway the width thereof. As the block of insulation 63 is delicately balanced, only slight pressure upon the treadle is required to close the switch, and when this occurs, the motor 59 will be instantly energized and the keeper moved into position to release the striker and permit the strong spring 26 to swing the striker forwardly and downwardly to deliver a hard blow and kill the animal that has stepped upon the treadle. The quick action which takes place prevents the animal from having time to jump out of the way of the descending striker and since the striker will remain in the thrown position for a short time after striking the animal, it will act as a choker or squeeze jaw during the time it is in the thrown position of Fig. 2.

After an animal has been killed, the striker automatically returns to set position, and during this movement of the striker it is desired to have the dead animal shifted out of the way and thus prevent it from interfering with the killing of another animal. In order to accomplish this, there has been provided a sweep 75 carried by the arm 76 of a rocker shaft 77 which is journaled through the top wall of the base and, at its lower end, is bent to form an arm or lever 78 terminating in a diagonally extending portion 79. The arm 78 is engaged by a spring 80 to normally hold the sweep in the position shown in Figs. 1 and 2, in which position it extends transversely of the base back of the opening 73. Since the diagonally extending portion 79 of the arm 78 extends across the opening 82 formed in the top wall under the arm 11 of the striker, the portion 83 of this arm which projects from the shaft 9 will engage the extension 79 and exert a cam action to swing the arm 78 and turn the rocker shaft to impart forward swinging movement to the arm 76 and the sweep 75 carried thereby as the striker moves upwardly. During this forward movement the sweep will push the dead animal out of the way and when the portion 83 of the striker moves out of engagement with the extension 79, the spring 80 will return the sweep to its normal position.

Having thus described the invention, what is claimed is:

1. In a trap, a body, a striker, a spring for urging the striker to striking position, a latch for releasably holding said striker in set position, electrically energized means for moving said latch to a releasing position, a circuit for said electrically energized means including a switch having animal actuated means for closing the switch, electrically energized means for restoring the striker to set position having a circuit including a switch normally open and adapted to be closed when the striker is in set position, and means actuated during movement of the striker to set position for displacing an animal killed by said striker.

2. In a trap, a body, a striker, a latch for releasably holding said striker in set position, animal actuated means for moving said latch to a releasing position, means for automatically restoring said striker to set position, and animal removing means separate from said striker and being yieldably held in a normal position and adapted to be actuated by said striker for displacing an animal during movement of the striker to set position.

3. In a trap, a body, a striker, a latch for releasably holding said striker in set position, electrically energized means for moving said latch to a releasing position including a normally open circuit closer and animal actuated means for closing the same, electrically energized means for restoring the striker to set position including a normally closed switch opened when the striker is engaged with said latch, a sweep carried by said body and actuated by said striker for displacing a killed animal during movement of the striker to set position, and means for restoring said sweep to its normal position after displacing the animal and release from the striker.

4. In a trap, a base, a striker mounted for swinging movement to a raised position, a latch for releasably holding said striker in raised position, electrically actuated means for moving said latch to a releasing position including a normally open switch and a trigger having a treadle disposed in position for actuation by an animal, means for swinging said striker downwardly toward the base and the treadle when said latch is moved to releasing position, electrically operated means for returning the striker to raised position including a normally closed switch and a trigger for opening the same disposed in position for engagement by the striker to open the switch as the striker is engaged with said latch, and animal removing means mounted for movement across the treadle and adjacent portions of the base and adapted to be actuated during upward movement of the striker.

5. In a trap, a base, a shaft rotatably mounted over the base, a striker carried by said shaft for swinging movement during rotation of the shaft, spring actuated means for rotating said shaft in a direction to swing the striker downwardly in a killing stroke, a keeper for engaging said striker and releasably securing the striker in a raised and set position, electrically operated means for moving the keeper to a releasing position including a normally open switch and a trigger therefor carrying a treadle disposed in position for an animal to step thereon and close the switch to cause movement of the keeper to release the striker, and electrically operated means for turning said shaft in a direction to swing the striker to a set position including a normally closed switch having a trigger disposed in position for engagement by the striker to open the switch and stop operation of the resetting means as the striker moves into engagement with the keeper.

6. In a trap, a base, a shaft rotatably mounted over the base, a striker carried by said shaft for swinging movement during rotation of the shaft, spring actuated means for rotating said shaft in a direction to swing the striker downwardly in a killing stroke, a keeper for engaging said striker and releasably securing the striker in a raised and set position, electrically operated means for moving the keeper to a releasing position including a normally open switch and a trigger therefor carrying a treadle disposed in position for an animal to step thereon and close the switch to cause movement of the keeper to release the striker, electrically operated means for turning the shaft in a direction to swing the striker upwardly to a set position in engagement with said keeper, a lost motion connection between the shaft and the resetting means for permitting the striker to temporarily remain in striking position for holding a struck animal and then move upwardly to set position, the resetting means including a normally closed switch having a trigger disposed in position for engagement by the striker to open the switch as the striker moves into engagement with said keeper.

7. In a trap a base, a shaft rotatably mounted over the base, a striker carried by said shaft for swinging movement during rotation of the shaft, spring actuated means for rotating said shaft in a direction to swing the striker downwardly in a killing stroke, a keeper for engaging said striker and releasably securing the striker in raised and set position, electrically operated means for moving the keeper to a releasing position including a normally open switch and a trigger therefor carrying a treadle disposed in position for an animal to step thereon and close the switch to cause movement of the keeper to release the striker, electrically operated means for turning the shaft in a direction to swing the striker upwardly to a set position in engagement with said keeper, a lost motion connection between the shaft and the resetting means for permitting the striker to temporarily remain in a striking position for holding a struck animal and then move upwardly to set position, the resetting means including a normally closed switch having a trigger disposed in position for engagement by the striker to open the switch as the striker moves into engagement with said keeper, a sweep for removing a killed animal mounted for swinging movement and having an operating arm, a spring engaging said operating arm for yieldably holding said sweep in its normal position, and means extending from said shaft for engaging the operating arm and imparting swinging movement to said sweep during movement of the striker to a set position.

8. In a trap, a base, a shaft rotatably mounted over the base, a striker carried by said shaft for swinging movement during rotation of the shaft, spring actuated means for rotating said shaft in a direction to swing the striker downwardly in a killing stroke, a keeper for engaging said striker and releasably securing the striker in a raised and set position, electrically operated means for moving the keeper to a releasing position including a normally open switch and a trigger therefor carrying a treadle disposed in position for an animal to step thereon and close the switch to cause movement of the keeper to release the striker, electrically operated means for turning the shaft in a direction to swing the striker upwardly to a set position in engagement with said keeper, a lost motion connection between the shaft and the resetting means for permitting the striker to temporarily remain in a striking position for holding a struck animal and then move upwardly to set position, the resetting means including a normally closed switch having a trigger disposed in position for engagement by the striker to open the switch as the striker moves into engagement with said keeper, and means for removing a killed animal adapted to be actuated during movement of the striker to a set position.

9. In a trap, a base having a top wall supported in an elevated position and formed with an opening near its front end, bait holding means over said opening, bearings extending upwardly from said base in transverse spaced relation to each other, a shaft rotatably mounted in said bearings, a striker carried by said shaft and extending radially therefrom, said striker being of a length adapting it to rest upon said top wall in front of the opening therein when swung forwardly in a killing stroke, a drum carried by said shaft, a pull line wound upon said drum, a spring connected with said line for exerting pull thereon to rotate the drum and shaft and swing the striker forwardly and downwardly in a killing stroke, a keeper for engaging the striker when swung upwardly and rearwardly and releasably holding the striker in a set position, electrically operated means for moving said keeper to a releasing position including a normally open switch having a trigger provided with a treadle plate disposed under the opening in the top wall of the base in position to be stepped upon by an animal trying to reach the bait, and electrically operated means for turning said shaft in a direction to reset the striker including a normally closed switch having a trigger disposed in position for engagement by the striker to open the switch as the striker moves into engagement with said keeper.

10. In a trap, a base having a top wall supported in an elevated position and formed with an opening near its front end, bait holding means over said opening, bearings extending upwardly from said base in transverse spaced relation to each other, a shaft rotatably mounted in said bearings, a striker carried by said shaft and extending radially therefrom, said striker being of a length adapting it to rest upon said top wall in front of the opening therein when swung forwardly in a killing stroke, a drum carried by said shaft, a pull line wound upon said drum, a spring connected with said line for exerting pull thereon to rotate the drum and shaft and swing the striker forwardly and downwardly in a killing stroke, a keeper for engaging the striker when swung upwardly and rearwardly and releasably holding the striker in set position, electrically operated means for moving said keeper to a releasing position including a normally open switch having a trigger provided with a treadle plate disposed under the opening in the top wall of the base in position to be stepped upon by an animal trying to reach the bait, a sprocket wheel loose on said shaft and formed with a socket, a spring latch carried by said shaft for bearing against a side face of said sprocket wheel and moving into and out of the socket to cause interrupted turning of the shaft with the sprocket, a drive shaft rotatably mounted, a small sprocket wheel carried by the drive shaft, a sprocket chain trained about the sprocket wheels, a worm wheel carried by said drive shaft and projecting downwardly through a slot in the top wall of said base, a power shaft rotatably mounted under the top wall and having a worm thread meshing with the worm wheel, an electric motor having its shaft coupled to said power shaft, and a circuit for said motor including a normally closed switch having a trigger extending upwardly through the top wall into position for engagement by said striker to open the switch and shut off the motor as the striker moves into engagement with said keeper.

11. In a trap, a base having a top wall formed with an opening near its front end, a bait holder over said opening, bearings rising from said top wall, a shaft rotatably carried by said bearings and spaced rearwardly from the opening, a striker having arms carried by said shaft, a drum carried by said shaft, a pull line wound about said drum and extending downwardly through the top wall, a spring under the top wall anchored at one end and having its other end secured to said pull line and adapted to exert pull upon the line to rotate the drum and shaft in a direction for swinging the striker forwardly and downwardly in a killing stroke, electrically operated means for turning said shaft in a direction to swing the striker upwardly and rearwardly to a set position including an electric motor and circuit wires leading therefrom, a normally closed switch for the circuit consisting of a mounting depending from the top wall, blocks of insulation carried by said mounting, one block being stationary and the other pivoted, contacts carried by said blocks, a spring between said blocks urging the pivoted block in a direction to effect engagement of its contact with the contact of the stationary block, and a trigger rod pivoted to the pivoted block and extending rearwardly therefrom and upwardly through the top wall in position for engagement by the striker to open the switch as the striker moves to a set position, a keeper for releasably holding the striker in set position, and electrically operated means for moving the keeper to a releasing position including a normally open switch having a trigger provided with a treadle plate disposed under the opening in the top plate.

12. In a trap, a base having a top wall formed with an opening near its front end, a bait holder over said opening, bearings rising from said top wall, a shaft rotatably carried by said bearings and spaced rearwardly from the opening, a striker having arms carried by said shaft, a drum carried by said shaft, a pull line wound about said drum and extending downwardly through the top wall, a spring under the top wall anchored at one end and having its other end secured to said pull line and adapted to exert pull upon the line to rotate the drum and shaft in a direction for swinging the striker forwardly and downwardly in a killing stroke, electrically operated means for turning said shaft in a direction to swing the striker upwardly and rearwardly to a set position including an electric motor and circuit wires leading therefrom, a normally closed switch for the circuit having a trigger extending upwardly through the top plate in position for engagement by the striker to open the switch as the striker moves to a set position, a bracket rising from said top plate, a keeper pivoted to said bracket and having a bill at its upper end and a forwardly projecting arm adjacent its lower end, a lever pivoted to said bracket and projecting forwardly therefrom over said arm, a spring between the arm and lever for yieldably holding the lever and the keeper in normal position, said lever when swung downwardly having its inner end adapted to engage the keeper and move the keeper to a releasing position, a pull rod extending vertically through the top wall with its upper end pivoted to the front end of said lever and its lower portion bent to form an arm extending rearwardly under the top wall, an electrically operated member under the top wall for exerting downward pull on the arm of the pull rod to draw the pull rod downwardly and swing the lever in a direction to move the keeper to a releasing position, circuit wires for the electrically operated member, and a switch for the circuit wires consisting of a mounting depending from the top wall, blocks of insulation carried by said mounting, one block being stationary and the other pivoted, contacts carried by said blocks, a balancing rod extending rearwardly from the pivoted block and normally holding the pivoted block in position to maintain the contacts out of engagement with each other, and a trigger rod extending forwardly from the pivoted block and carrying a treadle plate disposed under the opening in the top wall in position to be stepped upon by an animal trying to reach the bait and close the switch to cause the striker to be swung upwardly and rearwardly to a set position.

FRAZIER O. BROOKS.